A. T. WOODWARD.
Underground Telegraph Conductor.

No. 226,468.  Patented April 13, 1880.

Attest:  
J. Henry Kaiser  
J. A. Rutherford

Inventor:  
Arthur T. Woodward  
By James L. Norris.  
Atty.

UNITED STATES PATENT OFFICE.

ARTHUR T. WOODWARD, OF NEW YORK, ASSIGNOR OF ONE-HALF OF HIS RIGHT TO SAMUEL A. WOOD, OF BROOKLYN, N. Y.

UNDERGROUND-TELEGRAPH CONDUCTOR.

SPECIFICATION forming part of Letters Patent No. 226,468, dated April 13, 1880.

Application filed February 11, 1880.

*To all whom it may concern:*

Be it known that I, ARTHUR T. WOODWARD, a citizen of the United States, residing at New York, in the county of New York and State of New York, have invented new and useful Improvements in Troughs or Housings for Underground and Submarine Telegraph Wires, of which the following is a specification.

This invention relates to that class of troughs or housings for underground submarine telegraph wires which are provided with fillings of insulating material to embed and support the wires at proper distances apart; and it consists in providing such a trough or housing with a peculiar insulating-filling, which will be hereinafter described, and in forming said insulating material into transverse ridges elevated above the top surface of the trough-filling at suitable intervals, and at these points leading a portion of the wires over said ridge, in order that they may be readily accessible for making connections or for purposes of testing.

I do not leave the wires crossing said ridge entirely uncovered; but after they have been properly arranged I cover the ridge and wires with a layer of the insulating material to serve as a protection.

Figure 1:
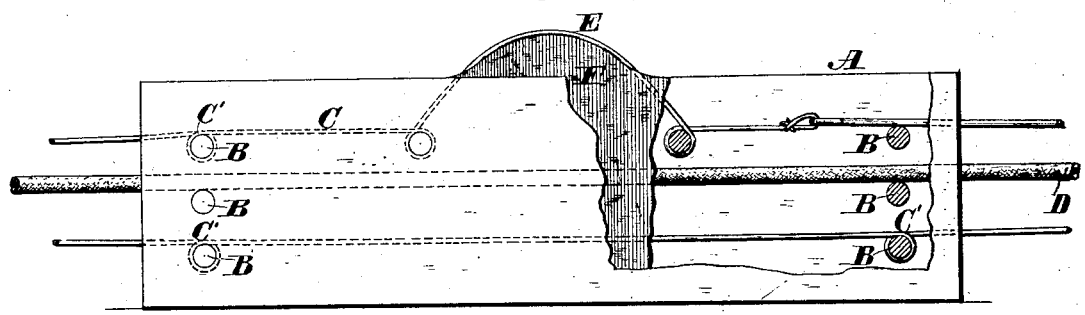
Figure 2:
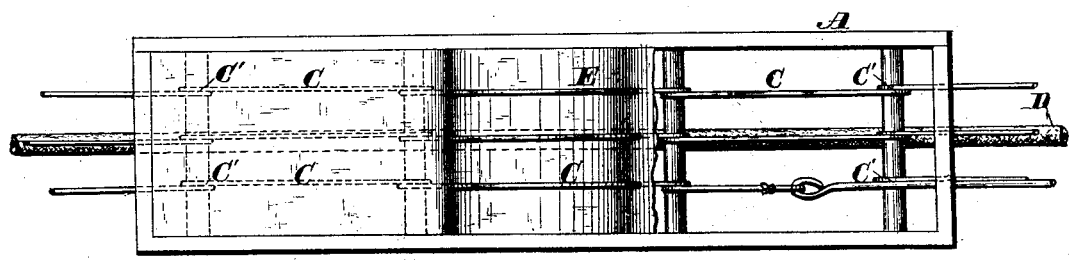
Figure 3:
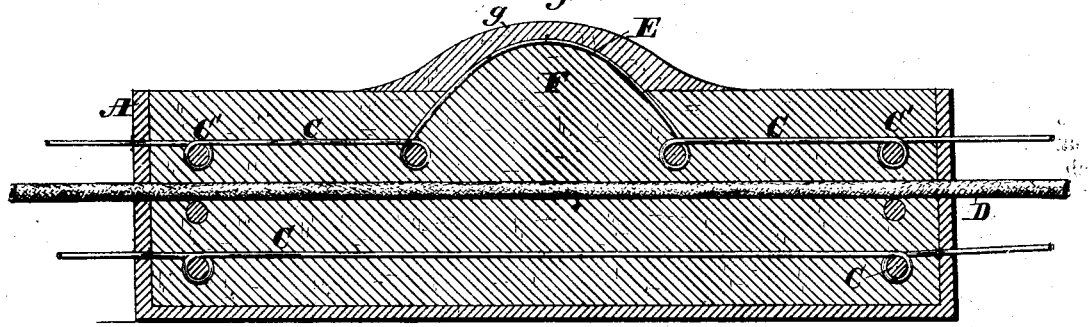

In the accompanying drawings, Figure 1 is a side elevation of a section of housing or trough constructed according to my invention, part of the wall and filling being removed to show the wires. Fig. 2 is a top view of the same. Fig. 3 is a longitudinal section of a portion of the trough and filling, showing the ridge and wires passing over the same covered by a protecting-layer of the insulating material.

The letter A indicates the housing, which may be a simple trough made of boards, rectangular in cross-section, of any suitable size and length. The shape is, however, not material. Between the sides of this trough are arranged cross-bars B, for supporting the wires before the insulating material is introduced, and for bracing the sides of the trough.

Small single wires, as at C, are preferably coiled once around each of the bars B, as shown at C', and stretched between them, except as will presently be explained; but a cable, as shown at D, may be simply laid across the bars which support it, or the bars may be provided with short upward-projecting headed pins or hooks for retaining the small wires in position before the trough is filled.

The troughs will, in practice, of course, often be many miles in length.

When the wires have all been properly arranged the trough is filled with a molten insulating material composed of the following ingredients properly combined, viz: powdered silica, such as glass, flint, quartz, or sand, eighteen hundred pounds; a vegetable or mineral resin or pitch, such as colophony or asphaltum, one hundred and seventy-five pounds; linseed-oil, (boiled or raw,) with a small addition of turpentine or benzine, twenty-five pounds.

The silica and resin or pitch should be separately reduced to impalpable powder, then intimately mixed and exposed to heat sufficient to melt the resin or pitch, when the linseed-oil mixed with turpentine or benzine may be added. The resin or pitch is caused to easily melt by the heat, and the admixture of the oil and turpentine or benzine renders it very fluent, so that it thoroughly coats the microscopic particles of silica, and when it cools in the trough the mass forms a very hard and exceedingly effective insulator, which is entirely impervious to water.

At suitable intervals along the length of the trough a portion of the smaller wires are left slack between two of the cross-bars B, and all so left slack are drawn upward to some distance above the top of the trough and supported in a curved position, as shown at E. When the trough is filled with the insulating material at these points the wires are temporarily left projecting above the top surface of the filling, and then the ridge, as shown at F, is formed under and close up against the wires from a proper quantity of the insulating material, which has been allowed to cool until it has about the consistency of clay used in molding bricks. When this ridge has cooled it forms a firm insulating support for the wires in a readily-accessible situation. The wires and the ridge may then be covered with a protecting layer, g, of the same material. This layer can easily be melted by the application of hot irons and removed when it is desired to reach the wires for making connections, testing, or other purposes.

I am aware that troughs have been used with various kinds of wire-supporting beds, and provided with branches containing similar beds or other supports for wires bent laterally into said branches, and I do not claim such troughs or any other construction in which the trough is not filled with an insulating material introduced in a plastic state and having ridges of the same material formed to support a number of the wires in a laterally-curved position for convenient access.

What I claim is—

1. The continuous trough or housing inclosing telegraph-wires and filled with a continuous column of insulating material, substantially as described, which at suitable intervals is formed into ridges above its general surface for supporting wires which have been curved upward to permit access thereto, substantially as described.

2. The continuous trough or housing inclosing telegraph-wires and filled with a continuous column of insulating material, substantially as described, which at suitable intervals is formed into ridges above its general surface for supporting wires which have been curved upward, said wires and the top surface of the ridge being covered by a layer of the same material with which the trough is filled.

In testimony whereof I have hereunto set my hand in the presence of two subscribing witnesses.

A. T. WOODWARD.

Witnesses:
ALBERT H. NORRIS,
J. A. RUTHERFORD.